(12) United States Patent
Yi et al.

(10) Patent No.: US 9,857,639 B2
(45) Date of Patent: Jan. 2, 2018

(54) METHOD FOR MANUFACTURING LIQUID CRYSTAL LENS

(71) Applicant: SAMSUNG DISPLAY CO., LTD., Yongin, Gyeonggi-Do (KR)

(72) Inventors: Jung Hwan Yi, Yongin-si (KR); Jin Oh Song, Seoul (KR); Chun Ki Choi, Yongin-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 14/995,999

(22) Filed: Jan. 14, 2016

(65) Prior Publication Data

US 2016/0259198 A1 Sep. 8, 2016

(30) Foreign Application Priority Data

Mar. 3, 2015 (KR) ........................ 10-2015-0030005

(51) Int. Cl.
| | | |
|---|---|---|
| B29D 11/00 | (2006.01) | |
| G02F 1/1343 | (2006.01) | |
| G02F 1/29 | (2006.01) | |
| G02B 3/14 | (2006.01) | |

(52) U.S. Cl.
CPC ......... *G02F 1/134309* (2013.01); *G02B 3/14* (2013.01); *G02F 1/29* (2013.01)

(58) Field of Classification Search
CPC ........ H03H 9/72; H03H 9/0576; H03H 9/725; G02F 1/1333; G02F 1/133345; G02F 1/13439; G02F 1/1343

USPC ........... 216/24, 26, 41, 46, 47, 75; 438/714, 438/717, 719, 725, 736
See application file for complete search history.

(56) References Cited

U.S. PATENT DOCUMENTS

| | | | |
|---|---|---|---|
| 7,553,712 B2 | 6/2009 | Shyu | |
| 2002/0075927 A1* | 6/2002 | Furushima | H01L 33/0062 372/46.01 |
| 2012/0164581 A1* | 6/2012 | Sho | C08F 12/20 430/285.1 |
| 2012/0248442 A1* | 10/2012 | Yu | G02F 1/133528 257/49 |
| 2013/0095590 A1* | 4/2013 | Lee | G02F 1/1368 438/34 |

(Continued)

FOREIGN PATENT DOCUMENTS

| | | |
|---|---|---|
| KR | 1020110104701 | 9/2011 |
| KR | 101209047 | 12/2012 |
| KR | 1020130046116 | 5/2013 |

*Primary Examiner* — Lan Vinh
(74) *Attorney, Agent, or Firm* — F. Chau & Associates, LLC

(57) ABSTRACT

A method for manufacturing a liquid crystal lens includes: patterning an insulating layer into a plurality of insulating regions spaced apart from each other on a substrate using a first photo mask; depositing a conductive layer on the insulating layer; applying a first, negative photoresist onto the conductive layer; exposing the first photoresist using a second photo mask in which first regions of the first photoresist corresponding to portions between adjacent insulating regions are opened; exposing the first photoresist using a third photo mask in which second regions corresponding to tops of the plurality of insulating regions are opened; and etching the conductive layer using the first photoresist.

6 Claims, 14 Drawing Sheets

(56) References Cited

U.S. PATENT DOCUMENTS

2013/0221481 A1\* 8/2013 Mitani ................ H01L 27/1266
257/506

\* cited by examiner

METHOD FOR MANUFACTURING LIQUID CRYSTAL LENS

CROSS-REFERENCE TO RELATED APPLICATION

This application claims priority under 35 U.S.C. §119 from Korean Patent Application No. 10-2015-0030005 filed in the Korean Intellectual Property Office on Mar. 3, 2015, and all the benefit accruing therefrom, the contents of which herein are incorporated by reference in their entirety.

BACKGROUND (a) Technical Field

Embodiments of the disclosure are directed to a liquid crystal lens and a method for manufacturing the same.

(b) Discussion of the Related Art

Recently, in accordance with the development of a display device technology, an interest in a three-dimensional (3D) stereoscopic image display device has increased, and various 3D image display methods have been studied.

One method frequently used to implement a stereoscopic image display uses a binocular display. In a binocular display method, an image perceived by a left eye and an image perceived by a right eye are displayed on the same display device, and are incident to the left eye and the right eye of an observer, respectively. That is, images observed at different angles are input to both eyes, respectively, to allow the observer to perceive a three-dimensional effect.

Methods of projecting an image to the left eye and the right eye of an observer include a method of using a barrier, a method of using a lenticular lens, which is a type of cylindrical lens, etc.

In a stereoscopic image display device that uses a barrier, a slit is formed in the barrier to divide an image from the display device into a left eye image and a right eye image, and the slit allows the left eye image and the right eye image to be input to the left eye and the right eye of the observer, respectively.

In a stereoscopic image display device that uses a lens, an image from the stereoscopic image display device is divided into a left eye image and a right eye image by changing an optical path using the lens.

In addition, a two-dimensional/three-dimensional image display device has been developed that can change a planar image display method into a stereoscopic image display method. To this end, a lens that may perform switching has been developed.

SUMMARY

Embodiments of the present disclosure can provide a method for manufacturing a liquid crystal lens that have decrease process (manufacturing) cost.

An embodiment provides a method for manufacturing a liquid crystal lens. A method for manufacturing a liquid crystal lens includes: patterning an insulating layer in to a plurality of insulating regions spaced apart from each other on a substrate using a first photo mask; depositing a conductive layer on the insulating layer; applying a first, negative photoresist onto the conductive layer; exposing the first photoresist using a second photo mask in which first regions of the first photoresist corresponding to portions between adjacent insulating regions are opened; exposing the first photoresist using a third photo mask in which second regions of the first photoresist corresponding to tops of the plurality of insulating regions are opened; and etching the conductive layer using the first photoresist.

Patterning the insulating layer may include: depositing the insulating layer on the substrate; applying a second, positive photoresist onto the insulating layer; exposing the second photoresist using the first photo mask, wherein the first photo mask includes patterns corresponding to an outer region of the insulating layer and patterns corresponding to an active region of the insulating layer; and removing regions of the second photoresist exposed by the first photo mask by developing the second photoresist.

Patterning the insulating layer may further include: etching and removing regions in the insulating layer corresponding to regions in the insulating layer; and stripping and removing the second photoresist.

Exposing the first photoresist using the third photo mask may include developing the first photoresist to remove regions of the first photoresist other than the first regions and the second regions.

Exposing the first photoresist using the third photo mask may include shifting the second photo mask so that open regions of the second photo mask correspond to the second regions of the first photoresist.

The third photo mask may be the shifted second photo mask.

Etching the conductive layer may include removing regions of the conductive layer other than those corresponding to the first and second regions of the first photoresist.

Regions of the conductive layer corresponding to first and second regions of the first photoresist may remain.

The first regions and the second regions may be alternately positioned in a horizontal direction, and the first regions may be positioned above the second regions in a vertical direction.

The method for manufacturing a liquid crystal lens may further include: stripping and removing the first photoresist.

The conductive layer may be a transparent conductive material.

The conductive material may include one of indium tin oxide (ITO) and indium zinc oxide (IZO).

The first photo mask may include: light blocking regions having a length of 2.0 μm that blocks light incident thereon; and open regions having a length of 3.4 μm through which light propagates.

Another embodiment provides another method for manufacturing a liquid crystal lens. Another method for manufacturing a liquid crystal lens includes: depositing a conductive layer on a plurality of spaced apart insulating regions; applying a first, negative photoresist onto the conductive layer; exposing the first photoresist using a first photo mask having openings corresponding to regions of the first photoresist between adjacent insulating regions; shifting the first photo mask so that openings correspond to regions of the first photoresist over tops of the plurality of insulating regions; exposing the first photoresist using the shifted first photo mask; and developing the first photoresist to create opening by removing regions of the first photoresist not exposed by the first photo mask and the shifted first photo mask.

The method may further include etching the conductive layer using the first photoresist to remove regions of the conductive layer exposed by openings in the first photoresist, wherein first and second regions of the conductive layer correspond to openings of the first photoresist remain, and the first regions and the second regions are alternately positioned in a horizontal direction, and the first regions are positioned on tops of each of the plurality of spaced apart insulating regions, and the second regions are positioned between each of the plurality of spaced apart insulating regions.

The method may further include depositing an insulating layer on the substrate; applying a second, positive photoresist onto the insulating layer; exposing the second photoresist using a second photo mask that includes a periodic pattern of openings; removing regions of the second photoresist exposed by the first photo mask by developing the second photoresist; etching and removing regions in the insulating layer corresponding to regions of the second photoresist exposed by the first photo mask, wherein the insulating layer is patterned into the plurality of spaced apart insulating regions; and stripping and removing the second photoresist.

The method may further include stripping and removing the first photoresist.

Another embodiment provides another method for manufacturing a liquid crystal lens. Another method for manufacturing a liquid crystal lens includes: depositing an insulating layer on the substrate; applying a first, positive photoresist onto the insulating layer; exposing the first photoresist using a first photo mask that includes a periodic pattern of openings; developing the first photoresist to remove regions thereof exposed by the openings in first photo mask; etching and removing regions in the insulating layer corresponding to exposed regions of the second photoresist to pattern the insulating layer into a plurality of spaced apart insulating regions; stripping and removing the first photoresist; depositing a conductive layer on the plurality of spaced apart insulating regions; and patterning the conductive layer using a second, negative photoresist exposed twice through a second photomask shifted between exposures. The patterned conductive layer include first regions positioned on tops of each of the plurality of spaced apart insulating regions, and second regions positioned between each of the plurality of spaced apart insulating regions.

Patterning the conductive layer using a second, negative photoresist may include: applying the second, negative photoresist onto the conductive layer; exposing the second photoresist using the second photo mask, wherein the second photo mask has openings corresponding to regions of the second photoresist between adjacent insulating regions; shifting the second photo mask so that openings correspond to regions of the second photoresist over tops of the plurality of insulating regions; exposing the second photoresist using the shifted second photo mask; and developing the second photoresist to create opening by removing regions of the second photoresist not exposed by the second photo mask and the second first photo mask.

The method may further include etching the conductive layer using the second photoresist to remove regions of the conductive layer exposed by openings in the second photoresist, wherein first and second regions of the conductive layer correspond to openings of the first photoresist remain, and stripping and removing the first photoresist.

The conductive layer may include one of indium tin oxide (ITO) and indium zinc oxide (IZO).

According to an embodiment, the cell gap of a liquid crystal layer included in a liquid crystal diffractive lens may be small, to easily control the liquid crystal molecules, and since the surfaces of the substrates contacting the liquid crystal layer are substantially flat, uniformity of the alignment of the liquid crystal layer may be improved.

In addition, according to an embodiment, a product yield may be improved through simpler processes, and the number of masks for manufacturing a liquid crystal lens may be decreased, such that a process cost may be decreased.

DETAILED DESCRIPTION OF THE EMBODIMENTS

Figure 1:
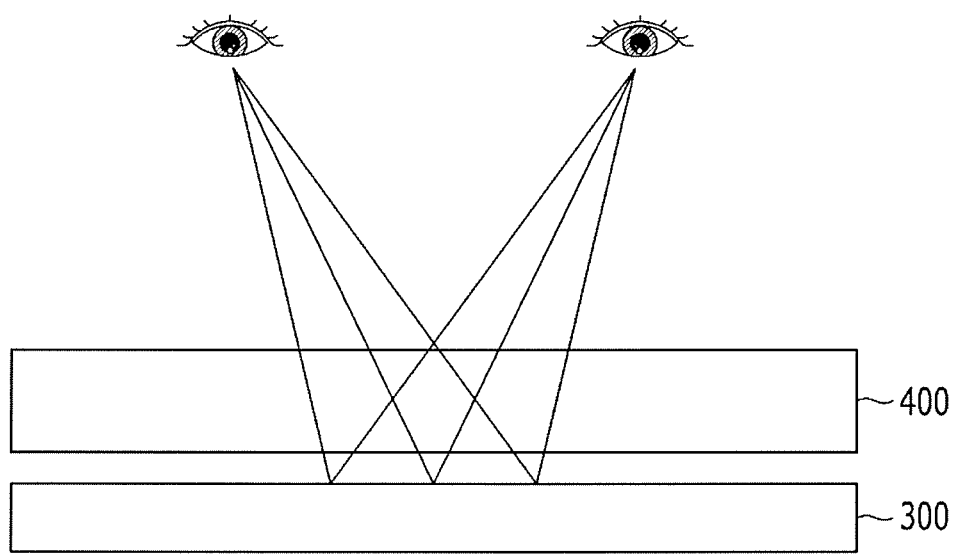
FIGS. 1 and 2 show a schematic structure of an image display device according to an exemplary embodiment and a method for forming a 2D image and a 3D image.

Hereinafter, exemplary embodiments will be described more fully with reference to the accompanying drawings so as to be easily practiced by those skilled in the art to which the present invention pertains. As those skilled in the art would realize, the described embodiments may be modified in various different ways, all without departing from the spirit or scope.

In the drawings, the thickness of layers, films, panels, regions, etc., may be exaggerated for clarity. Like reference numerals may designate like elements throughout the specification. It will be understood that when an element such as a layer, film, region, or substrate is referred to as being "on" another element, it can be directly on the other element or intervening elements may also be present.

Figure 2:
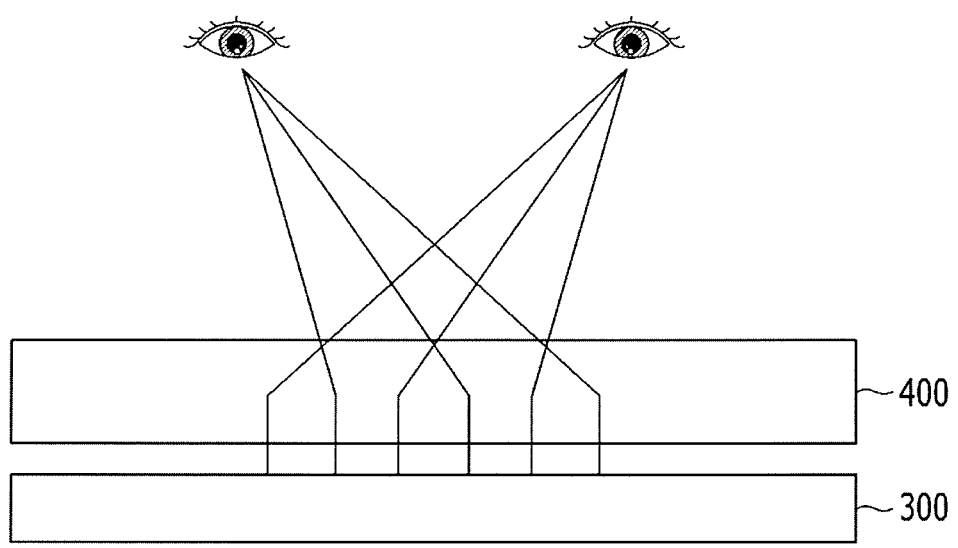

FIGS. 1 and 2 show a schematic structure of an image display device according to an exemplary embodiment and a method for forming a 2D image and a 3D image.

Referring to FIGS. 1 and 2, an image display device according to an exemplary embodiment includes a display panel 300 for displaying an image and a diffractive lens 400 positioned in front of an image display surface of the display panel 300.

The display panel 300 may one of be various flat panel displays, such as a plasma display panel (PDP), a liquid crystal display, an organic light emitting display, etc. The display panel 300 includes a plurality of pixels arranged in a matrix form that display an image. The display panel 300 displays one planar image in 2D mode, but may alternately display several images each corresponding to a viewing region, such as a right eye image, a left eye image, etc., in a space or time division scheme in 3D mode. For example, in 3D mode, the display panel 300 may alternately display the right eye image and the left eye image per one pixel column.

The diffractive lens 400, which can separate viewing regions of the image displayed on the display panel 300 using a light diffraction, may be switched on/off. That is, the diffractive lens 400 refracts the image of the display panel 300 using light diffraction to form images in corresponding viewing regions. The diffractive lens 400 is switched off when the display panel 300 is in 2D mode and is switched on when the display panel 300 is in 3D mode, thereby separating the viewing regions of the image of the display panel 300 from each other. Alternatively, the diffractive lens 400 may be switched off when the display panel 300 is in 3D mode and be switched on when the display panel 300 is in 2D mode.

FIG. 1 shows the same image arriving at a left eye and a right eye when the diffractive lens 400 is switched off, such that a 2D image is perceived, and FIG. 2 shows a switched-on diffractive lens 400 that separates and refracts the image of the display panel 300 to each viewing region, such as the left eye and the right eye, such that a 3D image is perceived.

The diffractive lens 400 may be implemented by a Fresnel zone plate. A Fresnel zone plate is a device that can serve as a lens using light diffraction instead of light refraction by using a plurality of concentric annuli radially arranged like a Fresnel zone whose width becomes narrower with increasing distance from the center.

Different types of Fresnel zone plates with different optical characteristics will be described with reference to FIGS. 3 and 4.

Figure 3:
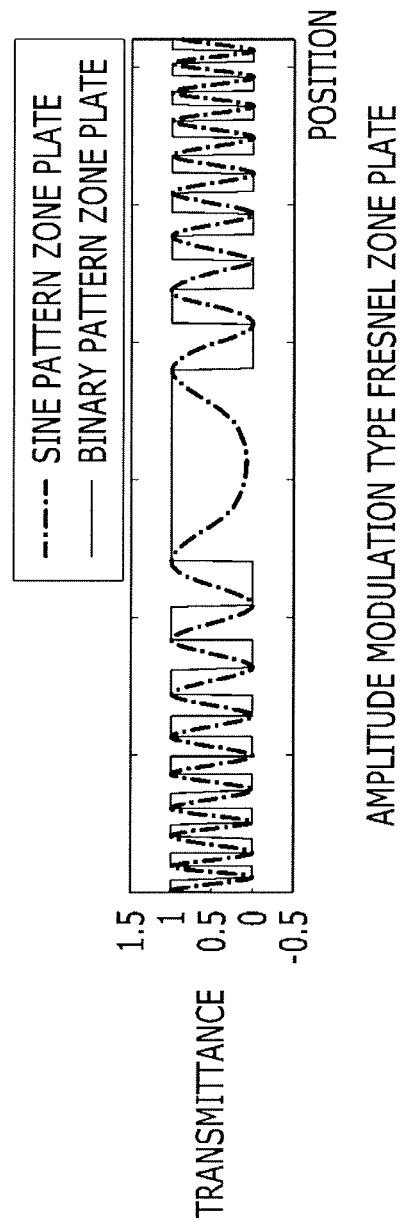
FIG. 3 is a graph of a change in transmittance as a function of position in an amplitude modulation type Fresnel zone plate.
Figure 4:
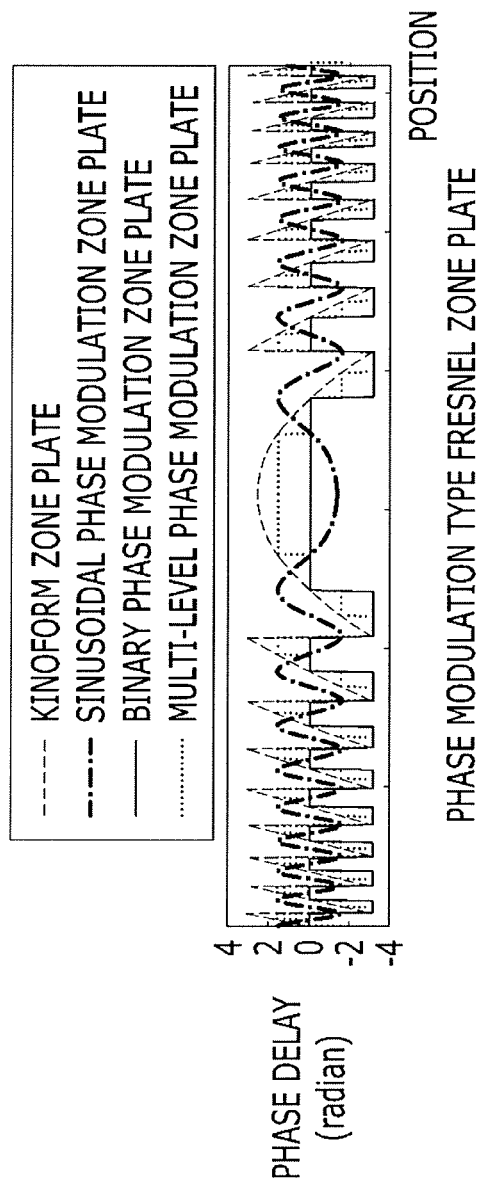
FIG. 4 is a graph of a change in a phase delay as a function of a position in a phase modulation type Fresnel zone plate.

FIG. 3 is a graph of a change in a transmittance as a function of position in an amplitude modulation type Fresnel zone plate, and FIG. 4 is a graph of a change in a phase delay as a function of position in a phase modulation type Fresnel zone plate. Here, the respective zones of the Fresnel zone plate correspond to regions in which waveforms are repeated in each graph.

Referring to FIG. 3, an amplitude modulation type Fresnel zone plate includes a sine pattern zone plate in which light transmittance in each zone changes to a sine pattern between 0 and 1, a binary pattern in which light transmittance in each zone is divided into portions of 1 and 0, etc., depending on a position thereof.

Referring to FIG. 4, a phase modulation type Fresnel zone plate includes a kinoform zone plate, a sinusoidal phase modulation zone plate, a binary phase modulation zone plate, a multi-level phase modulation zone plate, etc. A kinoform zone plate has the same phase delay as that of a Fresnel lens in each zone, and in a sinusoidal phase modulation zone plate, phase changes in each zone like a sinusoidal curved line. In a binary phase modulation zone plate, a phase delay in each zone is divided into two portions, one being 0 radian and the other being π radian, and in a multi-level phase modulation zone plate, a phase delay in each zone changes stepwise and a four step case is shown in FIG. 4.

When measuring light intensity at a focal point of each zone plate, diffraction efficiency of a phase modulation type Fresnel zone plate is better than that of a amplitude modulation type Fresnel zone plate, and diffraction efficiency of a multi-level phase modulation zone plate in a phase modulation type Fresnel zone plate is better except for a kinoform zone plate, which has a most intense light intensity at a focal point. Therefore, in some exemplary embodiments to be described below, a multi-level phase modulation zone plate will be described. However, embodiments of the present disclosure are not limited thereto.

Next, a liquid crystal diffractive lens according to an exemplary embodiment will be described with reference to FIG. 5.

Figure 5:
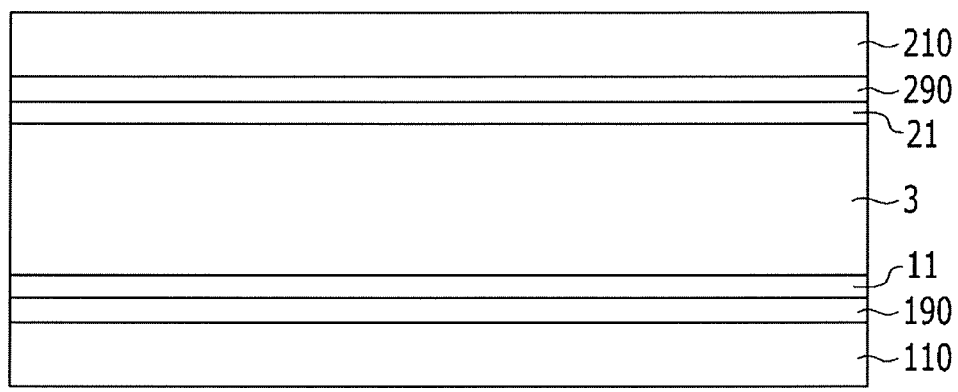
FIG. 5 is a cross-sectional view of a liquid crystal diffractive lens, which is an example of a diffractive lens according to an exemplary embodiment.

FIG. 5 is a cross-sectional view of a liquid crystal diffractive lens, which is an example of a diffractive lens according to an exemplary embodiment.

A liquid crystal diffractive lens 401 according to a present exemplary embodiment, which is an example of the diffractive lens 400 described in an exemplary embodiment of FIGS. 1 and 2, is a diffractive lens that uses a liquid crystal. The liquid crystal diffractive lens 401 according to a present exemplary embodiment includes first and second substrates 110 and 210 made of an insulating material such as glass, plastic, etc., that face each other and a liquid crystal layer 3 interposed between the first and second substrates 110 and 210.

A first electrode layer 190 and an alignment layer 11 are sequentially formed on the first substrate 110, and a second electrode layer 290 and an alignment layer 21 are sequentially formed on the second substrate 210.

The first electrode layer 190 and the second electrode layer 290 may include a plurality of electrodes and be made of a transparent conductive material such as indium tin oxide (ITO), indium zinc oxide (IZO), etc. An electric field can be formed in the liquid crystal layer 3 based on voltages applied to the first and second electrode layers 190 and 290 to control alignment of the liquid crystal molecules of the liquid crystal layer 3.

The alignment layers 11 and 21 determine an initial alignment of the liquid crystal molecules of the liquid crystal layer 3, and determine an initial alignment direction of the liquid crystal molecules to allow the liquid crystal molecules to rapidly realign depending on the electric field formed in the liquid crystal layer 3.

The liquid crystal layer 3 may be aligned in one of various modes, such as a horizontal alignment mode, a vertical alignment (VA) mode, etc., and the liquid crystal molecules may be configured in the initial alignment state so that the long side directions thereof do not twist from the first substrate 110 to the second substrate 210.

A liquid crystal diffractive lens according to a present exemplary embodiment is turned off and not operated when no voltages are applied to the first and second electrode layers 190 and 290, and is turned on and operated as a Fresnel zone plate described above when voltages are applied to the first and second electrode layers 190 and 290 that align the liquid crystal layer 3, thereby making it possible to refract light to serve as a lens.

Next, an example of the liquid crystal diffractive lens will be described with reference to FIGS. 6 to 9 together with FIG. 5, in which a repeated description of common elements thereof will be omitted.

Figure 6:
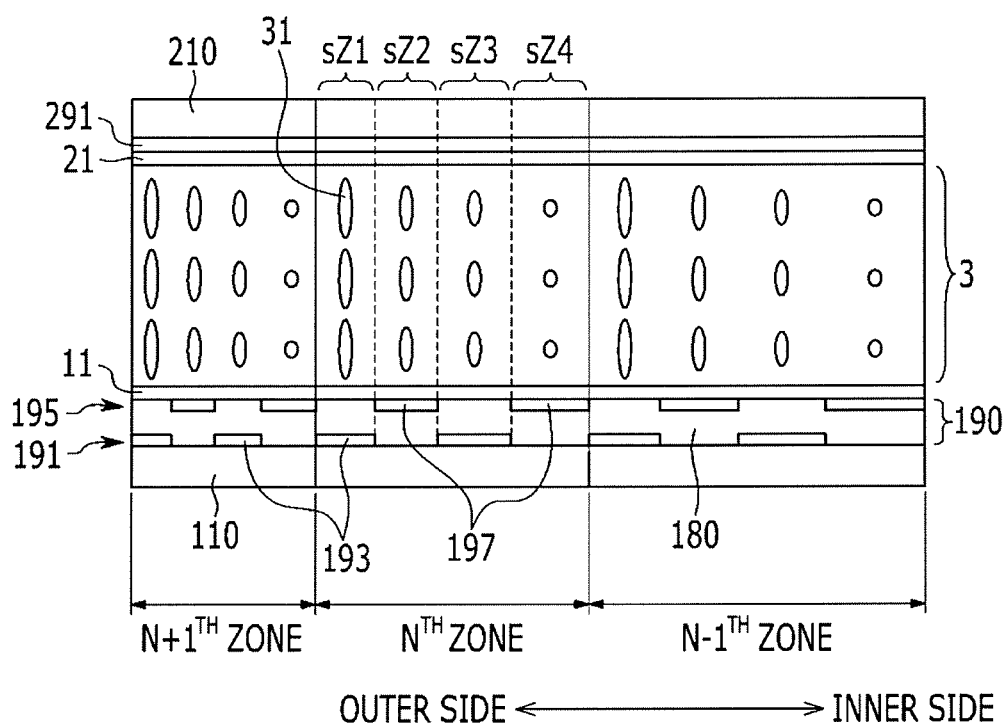
FIG. 6 is a cross-sectional view of a liquid crystal diffractive lens according to an exemplary embodiment.
Figure 7:
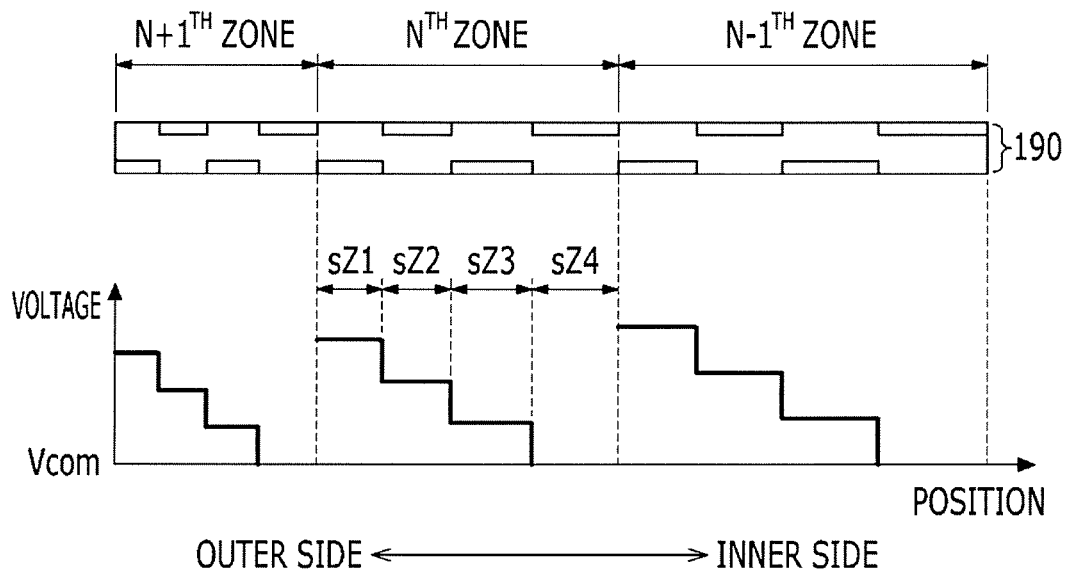
FIG. 7 shows a voltage applied to an electrode of a liquid crystal diffractive lens of FIG. 6.
Figure 8:
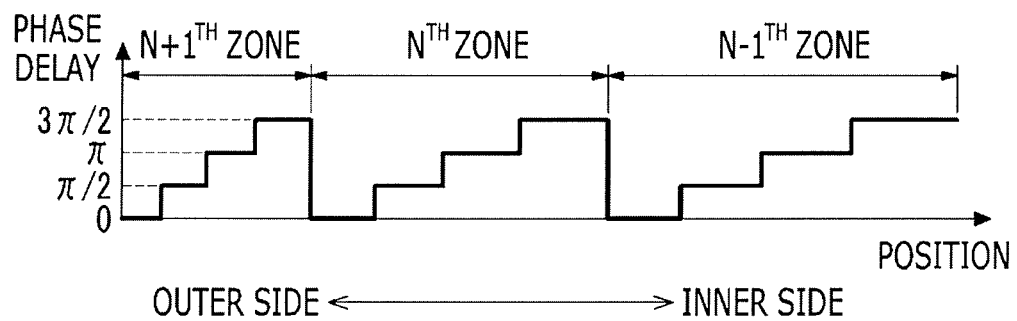
FIG. 8 shows a phase delay in each zone of a liquid crystal diffractive lens of FIG. 6.
Figure 9:
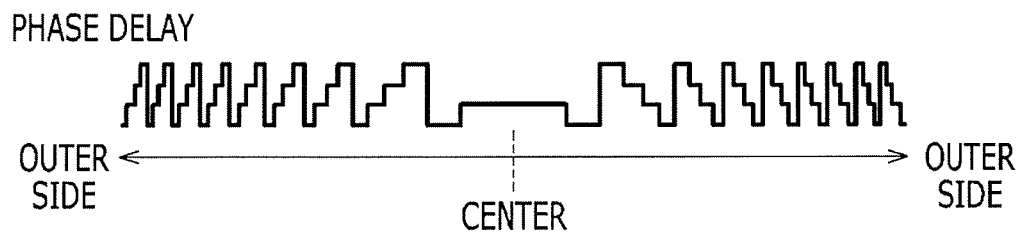
FIG. 9 shows a phase delay form included in one period of a liquid crystal diffractive lens of FIG. 6.

FIG. 6 is a cross-sectional view of a liquid crystal diffractive lens according to an exemplary embodiment, FIG. 7 shows a voltage applied to an electrode of a liquid crystal diffractive lens of FIG. 6, FIG. 8 shows a phase delay in each zone of a liquid crystal diffractive lens of FIG. 6, and FIG. 9 shows a phase delay form included in one period of a liquid crystal diffractive lens of FIG. 6.

Referring to FIG. 6, a liquid crystal diffractive lens according to an exemplary embodiment includes first and second substrates 110 and 210 that face each other and a liquid crystal layer 3 interposed between the first and second substrates 110 and 210. A first electrode layer 190 and an alignment layer 11 are sequentially formed on the first substrate 110, and a common electrode 291 and an alignment layer 21 are sequentially formed on the second substrate 210.

The first electrode layer 190 includes a first electrode array 191 that includes a plurality of first electrodes 193, an insulating layer 180 formed on the first electrode array 191, and a second electrode array 195 formed on the insulating layer 180 that includes a plurality of second electrodes 197.

The first electrodes 193 and the second electrodes 197 may be alternately positioned in a horizontal direction and may not overlap each other. Although FIG. 6 illustrates a case in which edges of the first electrodes 193 and the second electrodes 197 do not overlap each other, in other embodiments the edges of the first electrodes 193 and the second electrodes 197 may partially overlap each other.

Assuming that a center of one Fresnel zone plate is positioned at an inner side, widths of the first electrodes 193 and the second electrodes 197 in the horizontal direction, or intervals between the first electrodes 193 and the second electrodes 197, gradually become narrower with increasing distance from the center toward an outer side. Two first electrodes 193 and two second electrodes 197 are positioned in each zone of a zone plate, such as an n−1th zone, an nth zone, and an n+1th zone, and a region in each zone in which a single respective electrode 193 or 197 is positioned form sub-zones sZ1, sZ2, sZ3, and sZ4. Sub-zones from an outer side to an inner side in one zone are sequentially denoted by sZ1, sZ2, sZ3 and sZ4. Although FIG. 6 illustrates a case in which one zone includes four sub-zones sZ1, sZ2, sZ3 and sZ4, the number of sub-zones is not limited thereto. For example, unlike the embodiment shown in FIG. 6, widths in the horizontal direction of the first and second electrodes 193 and 197 within one zone may be constant, while widths in the horizontal direction of the first and second electrodes 193 and 197 may become narrower for zones further from the inner side.

Widths of the first and second electrodes 193 and 197 in the horizontal direction in all zones may be greater than or equal to a cell gap (d) of the liquid crystal layer 3. The cell gap (d) of the liquid crystal layer 3 may be about 10 μm or less, more specifically, about 5 μm or less, so that the liquid crystal molecules may be easily controlled.

The insulating layer 180 may be formed of an inorganic insulator, an organic insulator, etc., and electrically insulates the first electrode array 191 from the second electrode array 195.

The common electrode 291 is formed over the entire surface of the second substrate 210 and receives a predetermined voltage, such as a common voltage Vcom, etc. The common electrode 291 may be formed of a transparent conductive material such as ITO, IZO, etc.

The alignment layers 11 and 21 may be rubbed in a length direction, which is a direction vertical to a surface of the drawings, vertical to a width direction of the first electrodes 193 and the second electrodes 197, or a direction forming a predetermined angle with respect to the length direction. Directions in which the alignment layer 11 and the alignment layer 21 are rubbed may be opposite to each other.

The liquid crystal molecules 31 of the liquid crystal layer 3 may be initially aligned in a direction horizontal to surfaces of the substrates 110 and 210. However, alignment modes of the liquid crystal layer 3 are not limited thereto, and may also be a vertical alignment mode, etc., in other embodiments.

An operation of a liquid crystal diffractive lens will be described.

Referring to FIGS. 6 and 7, the first and second electrodes 193 and 197 in each zone of a Fresnel zone plate receive a stepwise voltage whose magnitude gradually increases from the inner side toward the outer side. For example, the second electrode 197 of the sub-zone sZ4 may receive the common voltage Vcom, the first electrode 193 of the sub-zone sZ3 may receive a voltage having a first level, the second electrode 197 of the sub-zone sZ2 may receive a voltage having a second level greater than the first level, and the first electrode 193 of the sub-zone sZ1 may receive a voltage having a third level greater than the second level. First or second electrodes 193 or 197 in the same sub-zones of a zone receive the same voltages so as to generate the same phase delay.

As described above, when the common voltage Vcom is applied to the common electrode 291 and voltages are applied to the first and second electrodes 193 and 197 as shown in FIG. 7, the liquid crystal molecules 31 of the liquid crystal layer 3 may align as shown in FIG. 6. That is, in the case of a horizontally aligned liquid crystal layer 3, the liquid crystal molecules 31 of sub-zone sZ4 maintain a horizontal alignment with respect to the surfaces of the substrates 110 and 210, and the liquid crystal molecules 31 align in directions that become more vertical with respect to the surfaces of the substrates 110 and 210 from the sub-zone sZ3 toward the sub-zone sZ1. However, a non-horizontally aligned liquid crystal layer 3, the liquid crystal molecules 31 may also align in a pattern different from the above-mentioned pattern.

Phase delay values of the liquid crystal layer 3 in the sub-zones sZ1, sZ2, sZ3, and sZ4 may become different from each other as shown in FIG. 8 by the alignment changes of the liquid crystal molecules 31 in the sub-zones sZ1, sZ2, sZ3, and sZ4 as described above. That is, in each zone of a Fresnel zone plate, the phase delay values gradually increase stepwise toward the inner side, thereby making it possible to implement a multi-level phase modulation type Fresnel zone plate as described above. Although the phase delay becomes small as a value of the voltage applied to the first electrodes 193 or the second electrodes 197 becomes large in a present exemplary embodiment, the liquid crystal layer 3 may also be selected so that a phase delay becomes large as a value of the voltage applied to the first or second electrodes 193 or 197 becomes large.

As described above, the voltages applied to the common electrode 291 and the first and second electrodes 193 and 197 can be adjusted to allow the phase delays of the liquid crystal layer 3 in each zone to be changed, thereby making it possible to form a phase modulation type Fresnel zone plate and refract light to be focused at a focal position through diffraction, extinguishment, and constructive interference of light passing through each zone. FIG. 9 shows a phase modulation type Fresnel zone plate implemented using the liquid crystal diffractive lens according to an exemplary embodiment.

When all of the voltages applied to the first and second electrodes 193 and 197 are the same, the liquid crystal layer 3 does not operate as a diffractive lens, and may allow a 2D image of the display panel 300 to be perceived by both eyes.

As described above, according to a present exemplary embodiment, the cell gap (d) of the liquid crystal layer 3 of the liquid crystal diffractive lens may be small, so that the liquid crystal molecules may be easily controlled, and since the surfaces of the first and second substrates 110 and 210 contacting the liquid crystal layer 3 are substantially flat, alignment uniformity of the liquid crystal layer 3 may be improved. In addition, using a Fresnel zone plate enables a further decrease of the thickness of the diffractive lens and of the cell gap of the liquid crystal layer, which can improve mass productivity of the diffractive lens used in the image display device.

Next, a liquid crystal diffractive lens according to another exemplary embodiment will be described with reference to FIGS. 5 to 9 described above together with FIG. 10, in which a repeated description of common elements thereof will be omitted.

Figure 10:
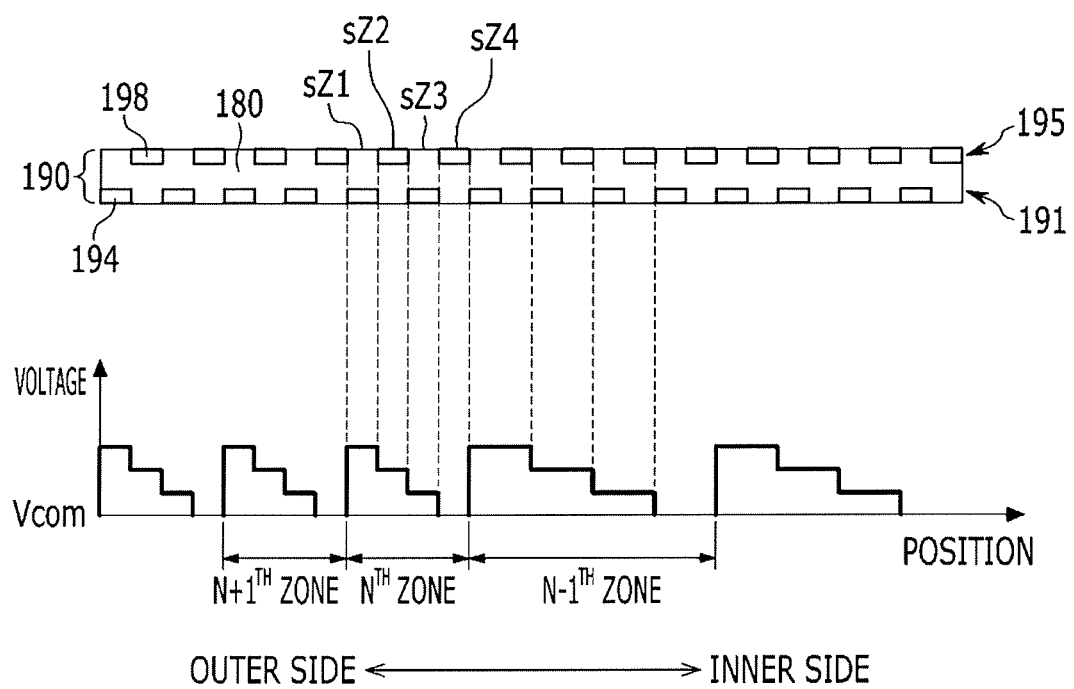
FIG. 10 shows a cross-sectional view of a portion of a liquid crystal diffractive lens according to an exemplary embodiment and a voltage applied to an electrode of a liquid crystal diffractive lens.

FIG. 10 shows a cross-sectional view of a portion of a liquid crystal diffractive lens according to an exemplary embodiment and a voltage applied to an electrode of the liquid crystal diffractive lens.

A liquid crystal diffractive lens according to a present exemplary embodiment is substantially the same as a liquid crystal diffractive lens shown in FIGS. 5 and 6 except for a structure of a first electrode layer 190.

In a present exemplary embodiment, the first electrode layer 190 includes a first electrode array 191 that includes a plurality of first electrodes 194, an insulating layer 180 formed on the first electrode array 191, and a second electrode array 195 formed on the insulating layer 180 that includes a plurality of second electrodes 198. Widths of the first electrodes 194 and the second electrodes 198 in the horizontal direction or intervals therebetween are constant regardless of positions of zones or sub-zones sZ1, sZ2, sZ3, and sZ4. The widths of the first and second electrodes 194 and 198 may be the same as the intervals therebetween. In addition, the widths of the first and second electrodes 194 and 198 in the horizontal direction may be greater than or equal to the cell gap (d) of the liquid crystal layer 3.

In a present exemplary embodiment, the numbers of first and second electrodes 194 and 198 included in the zones and the sub-zones sZ1, sZ2, sZ3, and sZ4 of the zone plate differ from each other depending on positions of the zones. Referring to FIG. 10, in an (n−1)th zone, each sub-zone sZ1, sZ2, sZ3, and sZ4 includes one first electrode 194 and one second electrode 198, such that the (n−1)th zone has total of four first electrodes 194 and a total of four second electrodes 198. In an nth zone and an (n+1)th zone, each sub-zone sZ1, sZ2, sZ3, and sZ4 includes one first electrode 194 or one second electrode 198, such that each zone has a total of two first electrodes 194 and a total of two second electrodes 198. Each sub-zone sZ1, sZ2, sZ3, and sZ4 may include at least one first or second electrode 194 and 198, and the numbers of electrodes 194 and 198 included in each zone may decrease from the inner side toward the outer side, but the numbers of first electrodes 194 and second electrodes 198 included in some neighboring zones may be the same.

In a present exemplary embodiment, to implement a Fresnel zone plate, the first electrodes 194 or the second electrodes 198 included in the same sub-zones sZ1, sZ2, sZ3, sZ4 in each zone receive the same voltages to generate the same phase delay. In addition, in the outer sub-zones sZ1 of each zone, the first and second electrodes 194 and 198 receive high voltages, so that voltages applied to each sub-zone and the resulting phase delay values have stepwise multi-level values as in an above-mentioned exemplary embodiment.

According to a present exemplary embodiment, since the first and second electrodes 194 and 198 have constant widths and intervals, positions of a Fresnel zone plates or positions and widths of the zones of each Fresnel zone plate in a liquid crystal diffractive lens may be freely adjusted, unlike an exemplary embodiment shown in FIG. 6. Therefore, when a liquid crystal diffractive lens is used in an image display device, the position of the zone plate of the liquid crystal diffractive lens may be moved, such that time division driving is possible. Therefore, a viewing region in one frame may be enlarged to increase resolution.

In addition, several features and effects of an exemplary embodiment of FIGS. 5 to 9 described above may also be present in a present exemplary embodiment.

Figure 11:
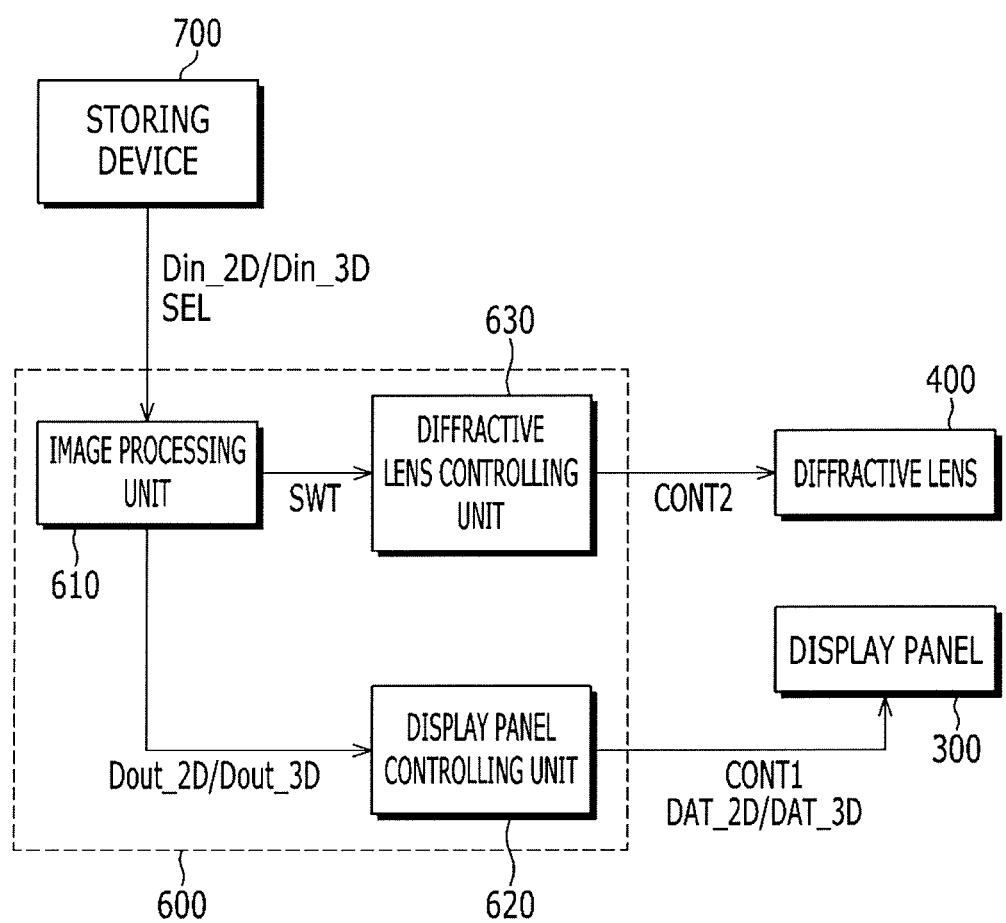
FIG. 11 is a block diagram of a method for driving an image display device according to an exemplary embodiment.

FIG. 11 is a block diagram of a method for driving an image display device according to an exemplary embodiment.

A storing device 700 positioned outside an image display device may store 2D image information and 3D image information therein, and receive selection information for determining which of the 2D and 3D images to display. The storing device 700, upon receiving the selection information, sends, depending on the selection information, a 2D image signal Din_2D or a 3D image signal Din_3D and a selection signal SEL to a controlling unit 600 of the image display device. Since a type of image signal sent by the storing device 700 can be determined, the selection signal SEL may be omitted.

An image processing unit 610 of the controlling unit 600 receives and appropriately processes the 2D image signal Din_2D or the 3D image signal Din_3D and the selection signal SEL and sends the processed 2D image signal Dout_2D or the processed 3D image signal Dout_3D to a display panel controlling unit 620, and sends a switching signal Swt to a diffractive lens controlling unit 630. The switching signal Swt is a signal for switching the diffractive lens 400 on/off.

The diffractive lens controlling unit 630, upon receiving the switching signal Swt, generates a diffractive lens control signal CONT2 and sends the diffractive lens control signal CONT2 to the diffractive lens 400 of the image display device. The diffractive lens control signal CONT2 controls switching the diffractive lens 400 on/off.

The display panel controlling unit 620, upon receiving the processed 2D image signal Dout_2D or the processed 3D image signal Dout_3D, generates a display panel control signal CONT1 and 2D image data DAT_2D or 3D image data DAT_3D and sends them to the display panel 300. The display panel control signal CONT1 controls whether the display panel 300 operates in 3D mode or 2D mode.

The display panel 300 operates in 2D mode or 3D mode depending on the display panel control signal CONT1. When the display panel operates in 2D mode, it displays the 2D image data DAT_2D, and when the display panel operates in 3D mode, it displays the 3D image data DAT_3D.

The diffractive lens 400 is switched on/off depending on the diffractive lens control signal CONT2. The diffractive lens 400 may be switched off when the display panel 300 is in 2D mode and be switched on when the display panel 300 is in 3D mode. Alternatively, the diffractive lens 400 may be switched off when the display panel 300 is in 3D mode and be switched on when the display panel 300 is in 2D mode. This may be determined depending on a type of diffractive lens 400.

FIGS. 12 to 21 are flow charts of a process of manufacturing a portion of the liquid crystal diffractive lens of FIG. 6.

Figure 12:
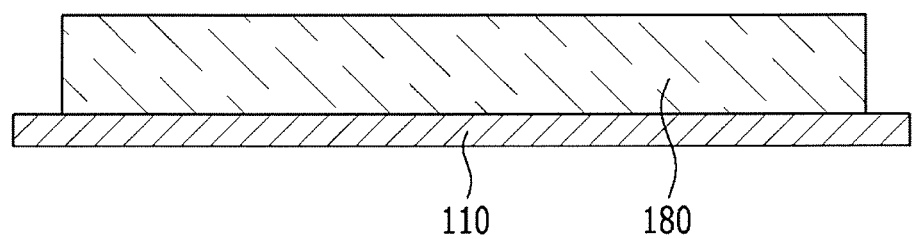
FIGS. 12 to 21 are flow charts of a process of manufacturing a portion of a liquid crystal diffractive lens of FIG. 6.

Referring to FIG. 12, the insulating layer 180 is formed on the first substrate 110. The insulating layer 180 may be formed by depositing an insulating material, such as SiOx, SiNx, etc., by a deposition method such as a plasma enhanced chemical vapor deposition (PECVD), an atmospheric pressure chemical vapor deposition (APCVD), a low pressure chemical vapor deposition (LPCVD), etc.

Figure 13:
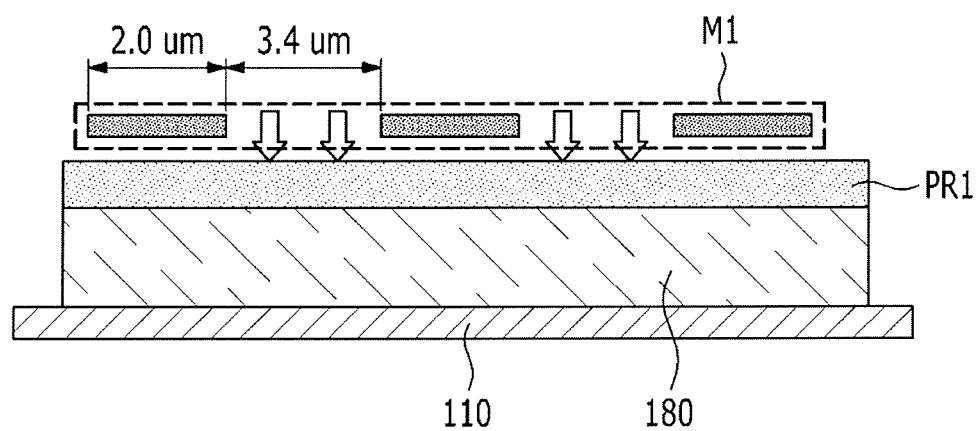

Referring to FIG. 13, a photoresist PR1 is applied onto the insulating layer 180 and the photoresist PR1 is exposed through a photo mask M1 having predetermined patterns. The photoresist PR1 is used for forming patterns on the insulating layer 180. The photo mask M1 may include open regions that transmit light therethrough and light blocking regions that block light thereon. In detail, one light blocking region may have a length of 2.0 μm, and one open region may have a length of 3.4 μm. The light blocking regions and the open regions of the photo mask M1 may alternately and repeatedly appear. In other words, the openings may form a periodic pattern in the light blocking regions. The photoresist PR1 may be a positive photoresist. The photo mask M1 is used to form contact holes for exposing some of signal transfer or bus lines in an outer side region of the liquid crystal diffractive lens rather than an active region thereof. The contact holes may be included in the insulating layer 180. In detail, the photomask M1 may include patterns for forming contact holes and patterns for forming patterns on the insulating layer 180.

Figure 14:
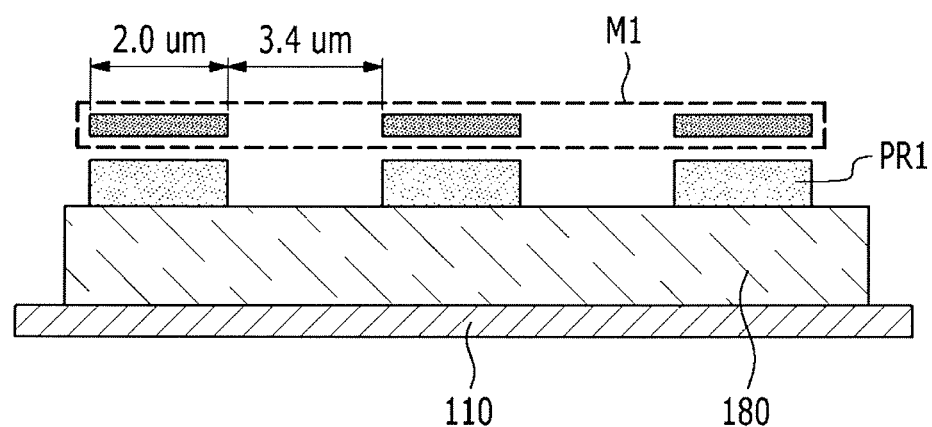

Referring to FIG. 14, the photoresist PR1 is developed so that the photoresist PR1 has predetermined patterns. In detail, when the photoresist PR1 is developed, exposed regions, hereinafter referred to as 'first exposure regions', in the photoresist PR1 are removed, such that the photoresist PR1 may have patterns as shown in FIG. 14.

Figure 15:
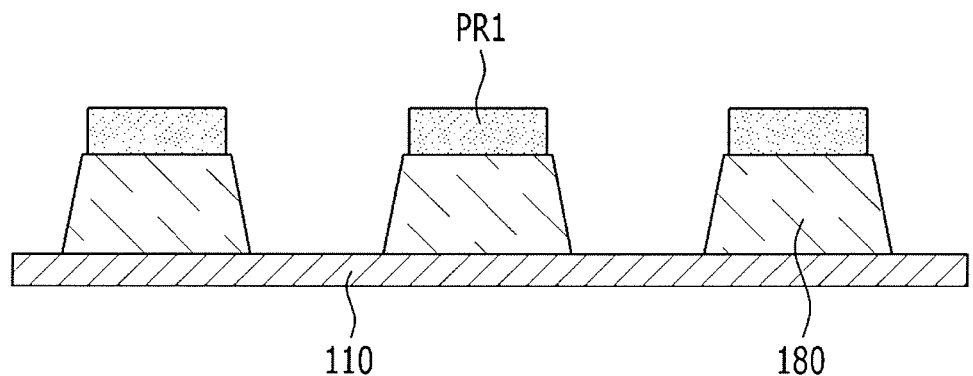

Referring to FIG. 15, the insulating layer 180 is etched using the patterns of the photoresist PR1. Regions of the insulating layer 180 corresponding to the first exposure regions are removed through the etching, such that a cross section of the insulating layer 180 may have patterns as shown in FIG. 15. In detail, the cross section of the insulating layer 180 is separated into a plurality of insulating regions. The plurality of insulating regions are spaced apart from each other. In addition, the patterns of the insulating layer 180 shown in FIG. 15 may be formed only in regions corresponding to the active region of the insulating layer 180, and the contact hole patterns may be formed in a region other than the active region of the insulating layer 180.

Figure 16:
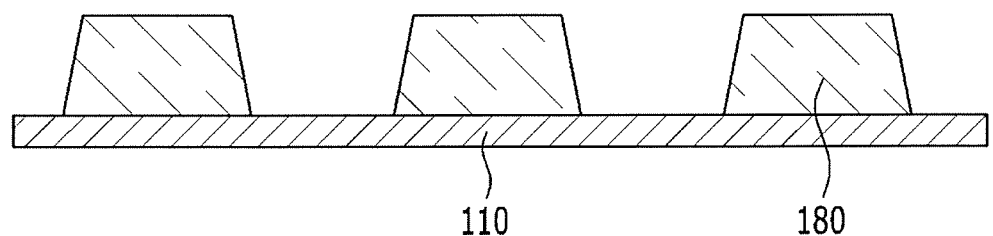

Referring to FIG. 16, the photoresist PR1 is stripped and removed.

In FIGS. 12 to 16, only one photo mask M1 is used. As described above, since the photo mask M1 used to form the contact holes is also used to form the insulating layer 180 patterns, no additional photo masks are required to pattern the insulating layer 180.

Figure 17:
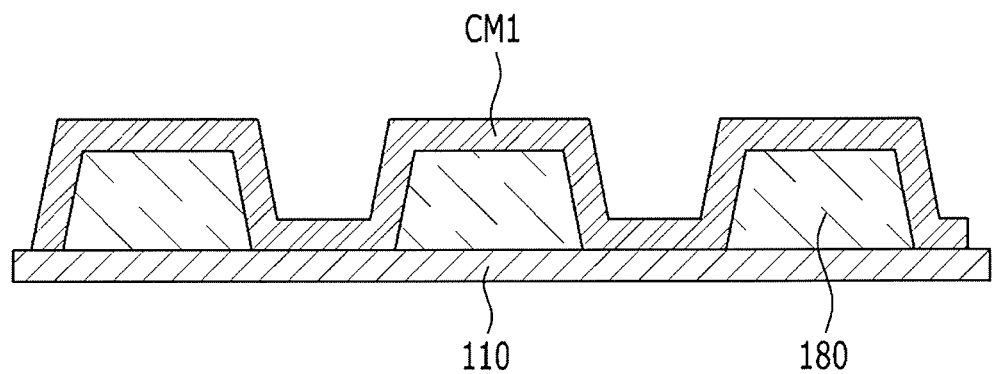

Referring to FIG. 17, a conductive layer CM1 is formed by depositing a conductive material onto the patterned insulating layer 180 shown in FIG. 16. The conductive material may be a transparent conductive material such as indium tin oxide (ITO), indium zinc oxide (IZO), etc.

Figure 18:
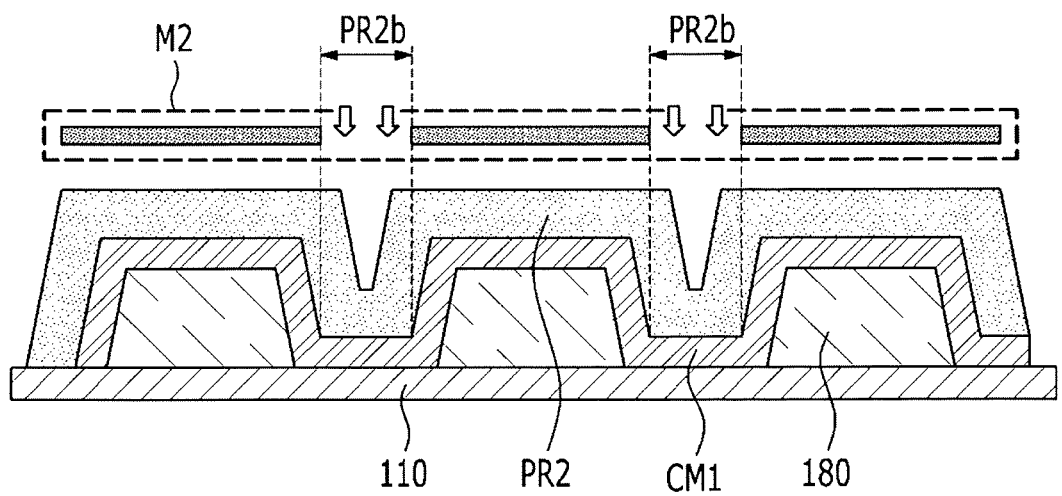

Referring to FIG. 18, a photoresist PR2 is applied onto the conductive layer CM1 and is exposed through a photo mask M2 having predetermined patterns. The photoresist PR2 may be a negative photoresist. The photoresist PR2 is used for forming patterns in the conductive layer CM1. In detail, partial regions PR2b in the photoresist PR2 are exposed in regions between insulating regions.

Figure 19:
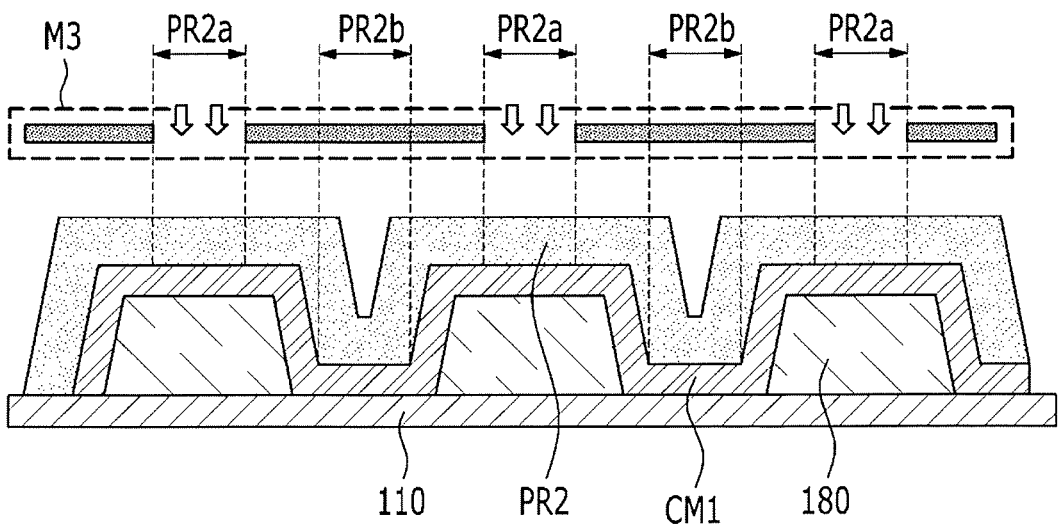

Referring to FIG. 19, the photoresist PR2 is exposed again through a photo mask M3 having predetermined patterns. In detail, regions PR2a different from the regions PR2b of the photoresist PR2 are exposed. Regions PR2a may correspond to tops of the plurality of insulating regions. The photo mask M3 may be different from the photo mask M2. Alternatively, the photo mask M3 may be a shifted photo mask M2. For example, the mask M2 may be shifted from a position shown in FIG. 18 in the horizontal direction by a predetermined length and be then reused as the photo mask M3. Referring to FIGS. 18 and 19, one photoresist PR2 may be exposed twice.

Figure 20:
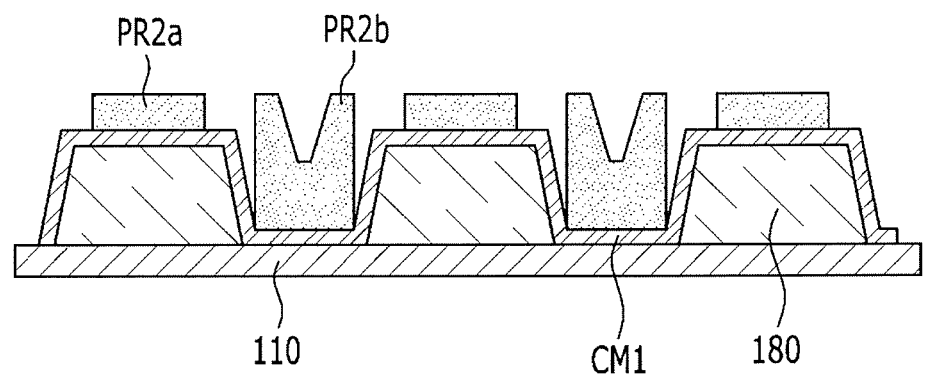

Referring to FIG. 20, the photoresist PR2 is developed. In detail, when the photoresist PR2 is developed, those regions other than the exposed regions PR2b and PR2a in the photoresist PR2 are removed, so that the photoresist PR2 may have patterns as shown in FIG. 20.

Figure 21:
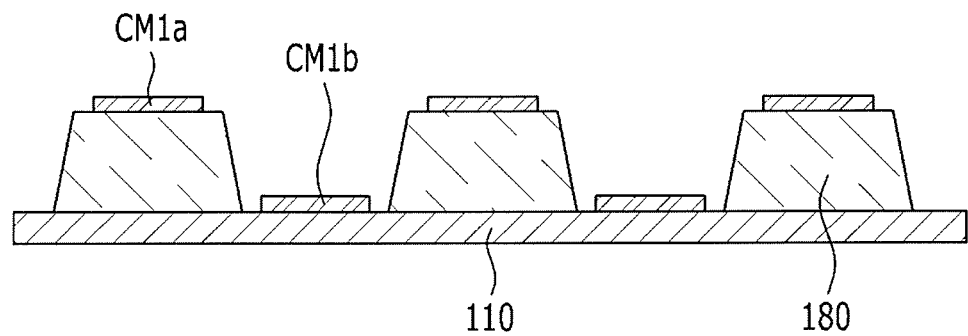

Referring to FIG. 21 the conductive layer CM1 is etched using the patterns of the photoresist PR2 and the photoresist PR2 is stripped and removed. Those regions other than regions CM1a and CM1b in the conductive layer CM1 are removed through the etching, so that the conductive layer CM1 may have patterns as shown in FIG. 21. The regions CM1a and CM1b are spaced apart from each other. However, the patterns of the conductive layer CM1 shown in FIG. 21 are exemplary and non-limiting, and the conductive layer CM1 may be formed to have patterns similar to the patterns shown in FIG. 21. For example, the region CM1b of the conductive layer CM1 may also contact the insulating layers 180 to the left and right of the region CM1b in the horizontal direction. In FIG. 21, the regions CM1a correspond to the second electrodes 197, and the regions CM1b correspond to the first electrodes 193. The regions CM1a and CM1b are arranged in double layers with the insulating layer 180 interposed therebetween. The regions and CM1a and CM1b are alternately positioned in a horizontal direction, and the regions CM1a are positioned above the regions CM1b in a vertical direction.

In FIGS. 17 to 21, one or two photo masks M2 and M3 are used.

A process of forming the first electrodes 193 and the second electrodes 197 having a double layer structure described above in FIG. 6 may be simplified to a process, hereinafter referred to as a 'first process', of forming the patterned insulating layer 180 and a process, hereinafter referred to as a second process, of forming the patterned conductive layer CM1. The first process includes depositing the insulating layer 180 (FIG. 12), exposing and then developing the photoresist PR1 (FIGS. 13 and 14), etching the insulating layer 180 (FIG. 15), and stripping the photoresist PR1 (FIG. 16). The second process includes depositing the conductive layer CM1 (FIG. 17), exposing the photoresist PR2 twice and then developing the photoresist PR2 (FIGS. 18 to 20), and etching the conductive layer CM1 and then stripping the photoresist PR2 (FIG. 21).

According to an exemplary embodiment, since one patterned insulating layer 180 is formed and one photoresist PR2 is exposed twice to pattern the conductive layer CM in a double layer structure, a process of forming the insulating layer 180 and a process of forming the conductive layer CM1 on the insulating layer 180 do not need to be repeatedly performed to form the double layered electrodes 193 and 197. Therefore, the number of photo masks used to form the insulating layer 180 may be decreased, and the number of photolithography processes may be decreased, which can decrease processing costs.

In addition, when the process of forming the insulating layer 180 and the process of forming the conductive layer CM1 on the insulating layer 180 are repeatedly performed to form the double layered electrodes 193 and 197, at least four photo masks are used for the active region of the liquid crystal diffractive lens. However, according to an exemplary embodiment, fewer than four photo masks are used for the active region of the liquid crystal diffractive lens. In detail, one photo mask M1 is used in the first process, and one or two masks M2 and M3 are used in the second process.

While embodiments of this disclosure have been described with reference to what are presently considered to be practical exemplary embodiments, it is to be understood that embodiments of the disclosure are not limited to the disclosed embodiments, but, on the contrary, are intended to cover various modifications and equivalent arrangements included within the spirit and scope of the appended claims.

What is claimed is:

1. A method for manufacturing a liquid crystal lens, comprising:
    depositing an insulating layer on a substrate;
    applying a first, positive photoresist onto the insulating layer;
    exposing the first photoresist using a first photo mask that includes a perdiodic pattern of openings;
    developing the first photoresist to remove regions thereof exposed by the openings in first photo mask;
    etching and removing regions in the insulating layer corresponding to exposed regions of the first photoresist to pattern the insulating layer into a plurality of spaced apart insulating regions;
    stripping and removing the first photoresist;
    depositing a conductive layer on the plurality of spaced apart insulating regions; and
    patterning the conductive layer using a second, negative photoresist exposed twice through a second photomask shifted between exposures,
    wherein the patterned conductive layer comprises first regions positioned on tops of each of the plurality of spaced apart insulating regions, and second regions positioned between each of the plurality of spaced apart insulating regions.

2. The method of claim 1, wherein:
    the first photo mask includes:
    light blocking regions having a length of 2.0 μm that block light incident thereon; and
    open regions having a length of 3.4 μm through which light propagates.

3. The method of claim 1, wherein patterning the conductive layer using a second, negative photoresist comprises:
    applying the second, negative photoresist onto the conductive layer;
    exposing the second photoresist using the second photo mask, wherein the second photo mask has openings corresponding to regions of the second photoresist between adjacent insulating regions;
    shifting the second photo mask so that openings correspond to regions of the second photoresist over tops of the plurality of insulating regions;
    exposing the second photoresist using the shifted second photo mask; and
    developing the second photoresist to create opening by removing regions of the second photoresist not exposed by the second photo mask and the second first photo mask.

4. The method of claim 3, further comprising:
    etching the conductive layer using the second photoresist to remove regions of the conductive layer exposed by openings in the second photoresist, wherein first and second regions of the conductive layer correspond to openings of the first photoresist remain, and
    stripping and removing the first photoresist.

5. The method of claim 1, wherein the conductive layer comprises a transparent conductive material.

6. The method of claim 5, wherein the conductive layer includes one of indium tin oxide (ITC) and indium zinc oxide (IZO).

* * * * *